US008141084B2

(12) United States Patent
Coppinger et al.

(10) Patent No.: US 8,141,084 B2
(45) Date of Patent: Mar. 20, 2012

(54) MANAGING PREEMPTION IN A PARALLEL COMPUTING SYSTEM

(75) Inventors: Richard J. Coppinger, Milton, NY (US); Deryck X. Hong, Poughkeepsie, NY (US); Chulho Kim, Poughkeepsie, NY (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 12/098,868

(22) Filed: Apr. 7, 2008

(65) Prior Publication Data

US 2011/0061053 A1    Mar. 10, 2011

(51) Int. Cl.
*G06F 11/34* (2006.01)

(52) U.S. Cl. ........................................................ 718/102

(58) Field of Classification Search .................. None
See application file for complete search history.

(56) References Cited

U.S. PATENT DOCUMENTS

| | | | | |
|---|---|---|---|---|
| 4,318,173 | A * | 3/1982 | Freedman et al. | 718/103 |
| 6,253,225 | B1 * | 6/2001 | Nakahara et al. | 718/100 |
| 6,748,453 | B2 * | 6/2004 | Law et al. | 719/314 |
| 6,904,595 | B2 * | 6/2005 | Alford et al. | 718/102 |
| 7,191,349 | B2 * | 3/2007 | Kaushik et al. | 713/323 |
| 7,389,332 | B1 * | 6/2008 | Muchow et al. | 709/220 |
| 7,512,728 | B2 * | 3/2009 | Tseng | 710/100 |
| 2003/0172104 | A1 * | 9/2003 | Hooman et al. | 709/103 |
| 2003/0208521 | A1 * | 11/2003 | Brenner et al. | 709/103 |
| 2006/0212869 | A1 * | 9/2006 | Bril et al. | 718/102 |
| 2007/0044102 | A1 | 2/2007 | Casotto | |
| 2007/0195356 | A1 | 8/2007 | Coppinger et al. | |
| 2008/0077928 | A1 * | 3/2008 | Matsuzaki et al. | 718/104 |

OTHER PUBLICATIONS

Kontothanassis, L.I. etal., Scheduler Consciouos Synchronization,Feb. 1997, ACM, ACM Transactions on Computers, vol. 15, No. 1, pp. 3-40.*

* cited by examiner

*Primary Examiner* — Eric Coleman
(74) *Attorney, Agent, or Firm* — Jon A. Gibbons; Fleit Gibbons Gutman Bongini & Bianco PL (57) ABSTRACT

This present invention provides a portable user space application release/reacquire of adapter resources for a given job on a node using information in a network resource table. The information in the network resource table is obtained when a user space application is loaded by some resource manager. The present invention provides a portable solution that will work for any interconnect where adapter resources need to be freed and reacquired without having to write a specific function in the device driver. In the present invention, the preemption request is done on a job basis using a key or "job key" that was previously loaded when the user space application or job originally requested the adapter resources. This is done for each OS instance where the job is run.

18 Claims, 8 Drawing Sheets

| 302 | 304 | 306 | 308 | |
|---|---|---|---|---|
| JOBKEY | TASK IDS | NODE | ADAPTER | ... |
| 65732 | 46 | 2 | 4 | ... |
|  | 126 | 645 | 0 | ... |
|  | 17 | 25 | 12 | ... |
|  | ... | ... | ... | ... |

| 322 | 324 | 326 | 328 | |
|---|---|---|---|---|
| JOBKEY | TASK IDS | NODE | ADAPTER | ... |
| 45328 | 71 | 3 | 8 | ... |
|  | 0 | 63 | 3 | ... |
|  | 2 | 25 | 0 | ... |
|  | ... | ... | ... | ... |

| 342 | 344 | 346 | 348 | |
|---|---|---|---|---|
| JOBKEY | TASK IDS | NODE | ADAPTER | ... |
| 74391 | 23 | 42 | 31 | ... |
|  | 4 | 33 | 5 | ... |
|  | 13 | 2 | 10 | ... |
|  | ... | ... | ... | ... |

FIG. 3

| 402 | 404 | 406 | 408 | 410 | |
|---|---|---|---|---|---|
| TASK 1 | TASK 2 | TASK 3 | TASK 4 | TASK 5 | ... |
| PREEMPTED | PREEMPT_FAILED | PREEMPTED | PREEMPTED | PREEMPT_IN_PROGRESS | ... |

| 442 | 444 | 446 | 448 | 450 | |
|---|---|---|---|---|---|
| TASK 1 | TASK 2 | TASK 3 | TASK 4 | TASK 5 | ... |
| RESUMED_FAILED | RESUMED | RESUMED | RESUMED_IN_PROGESS | RESUMED_IN_PROGESS | ... |

MANAGING PREEMPTION IN A PARALLEL COMPUTING SYSTEM

STATEMENT REGARDING FEDERALLY SPONSORED RESEARCH OR DEVELOPMENTS

This invention was made with government support under subcontract HR0011-07-9-0002 awarded by DARPA. The Government has certain rights in this invention.

FIELD OF THE INVENTION

The present invention generally relates to the field of scheduling jobs in a computing environment, and more particularly relates to scheduling jobs across multiple processors in a parallel computing system.

BACKGROUND OF THE INVENTION

A parallel application (also referred to task parallelism or function parallelism) is a form of parallelization of computer code across multiple processors in parallel computing systems. Task parallelism focuses on distributing execution processes (tasks or threads) across different parallel computing nodes. Scheduling techniques are used to schedule computer jobs in a parallel computing system so that the resources of the environment are efficiently utilized.

Traditionally, resource bookkeeping is buried at the lowest levels of the job scheduling logic, making it difficult and time consuming to extend existing job scheduling algorithms with novel paradigms, such as backfill and preemption. Resource bookkeeping is the tracking of used, free, bad, and to-be-used resources in the job scheduling algorithm. With current job scheduling algorithms, which allow a large variety of scheduling options, such as scheduling by hostlist, blocking, packing, etc., trying to extend the existing algorithms to support new, moderately complex scheduling paradigms, and at the same time maintain correctness of the current options, often requires substantial re-coding modifications to most of the underlying options. Typically, most of the currently supported scheduling options must also be supported by the new paradigms. As a result, introduction of new paradigms has a substantial impact on the existing code base. Development and testing cycles along with product quality are thus greatly effected.

One prior method used across multiple processors in a parallel computing system is a callback mechanism in the device drive (kernel space). The callback mechanism is implemented on a per thread/resource basis and was not portable. Therefore migrating from AIX to Linux requires extensive re-coding. Further this callback method is prone to timing errors. In order to properly handle these timing errors, the driver has to be recoded to provide stable and reliable preemption support. This delays development support for user space application preemption until driver can be recoded. The need to create customized code can be expensive and time consuming.

Resource scheduling can also be further complicated if the hardware in the parallel computing systems hardware in which the resource scheduler manages and/or the software for the resource scheduler changes. Again, preempting tasks running on each OS today requires customized programs that communicate with the scheduler. Development time, costs, and product quality are hence greatly impacted.

Therefore a need exists to overcome the problems with the prior art as discussed above.

SUMMARY OF THE INVENTION

The present invention provides a portable and non intrusive method for preemption support for any user space application running over interconnects that needs to free and re-obtain resources, such as adapter resources, associated with running over the interconnects.

This present invention provides a portable user space application release/reacquire of adapter resources for a given job on a computing node (or simply node) in a parallel computing system using information in a network resource table. The information in the network resource table is obtained when a user space application is loaded by a resource manager/load leveler. The present invention provides a portable solution that will work for any interconnect where adapter resources need to be freed and reacquired without having to write a specific function in the device driver. In the present invention, the preemption request is done on a job basis using a key or "job key" that was previously loaded when the user space application or job originally requested the adapter resources. This is done for each OS instance where the job is run.

In one embodiment the present invention is implemented as a daemon application that is providing this service is called Protocol Network Services Daemon (PNSD). It loads and unloads network adapter resources through Network Resource Table (NRT) APIs. The NRT APIs have been extended to provide preemption support: nrt_preemptjob( ) nrt_resumejob( ) nrt_query_preemption_state( ).

Preempt and resume calls are done on a job basis per OS instance. This way, the resource manager requires less tracking. The present invention provides managing preemption at each OS instance versus on a per process level. This is important in managing preemption of user space applications across multiple processors in a parallel computing system with a large number of CPUs and/or cores. For example in the IBM Power Parallel System the CPU count can be as large as 64. Having to manage just 1000 OS instance versus managing 64000 threads for preemption status is very critical in having an efficient preemption/resume capability.

The present invention is implemented as a system, a method, and a computer readable medium for managing preemption of a parallel application. The method executes on a computing node in a parallel computing system. The method begins by receiving, from a scheduler, a request with a key for managing preemption of a parallel application with a plurality of tasks running on at least one computing node in a multi-processor system as part of a parallel computing system, wherein the key has been previously associated to the parallel application. Next, using the key, a network resource table is accessed to retrieve all address locations of tasks associated with the application. The method collects a status for the tasks associated with the application by completing the following: i) sending a request to each of the tasks; and ii) storing at least one status entry for each of the tasks in a status table based on a type of reply received from each of the tasks. A reply is sent to the scheduler with an overall status of the application in response to the status entry for each of the tasks in the status table.

In one embodiment, the address locations of both nodes and adapters in the parallel computing system are retrieved from the network resource table. The status for each of the tasks associated with the application is stored.

In one embodiment the request from a scheduler is for preempting the parallel application and the reply is sent to the scheduler includes the overall status to indicate one of preempted, preempt_failed, and preempt_in_progress.

In another embodiment the request from the scheduler is for resuming the parallel application and the reply is sent to the scheduler includes the overall status to indicate one of resumed; resumed_failed; resume_in_progress.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Multiple Processor System in Parallel Computing System

Figure 1:
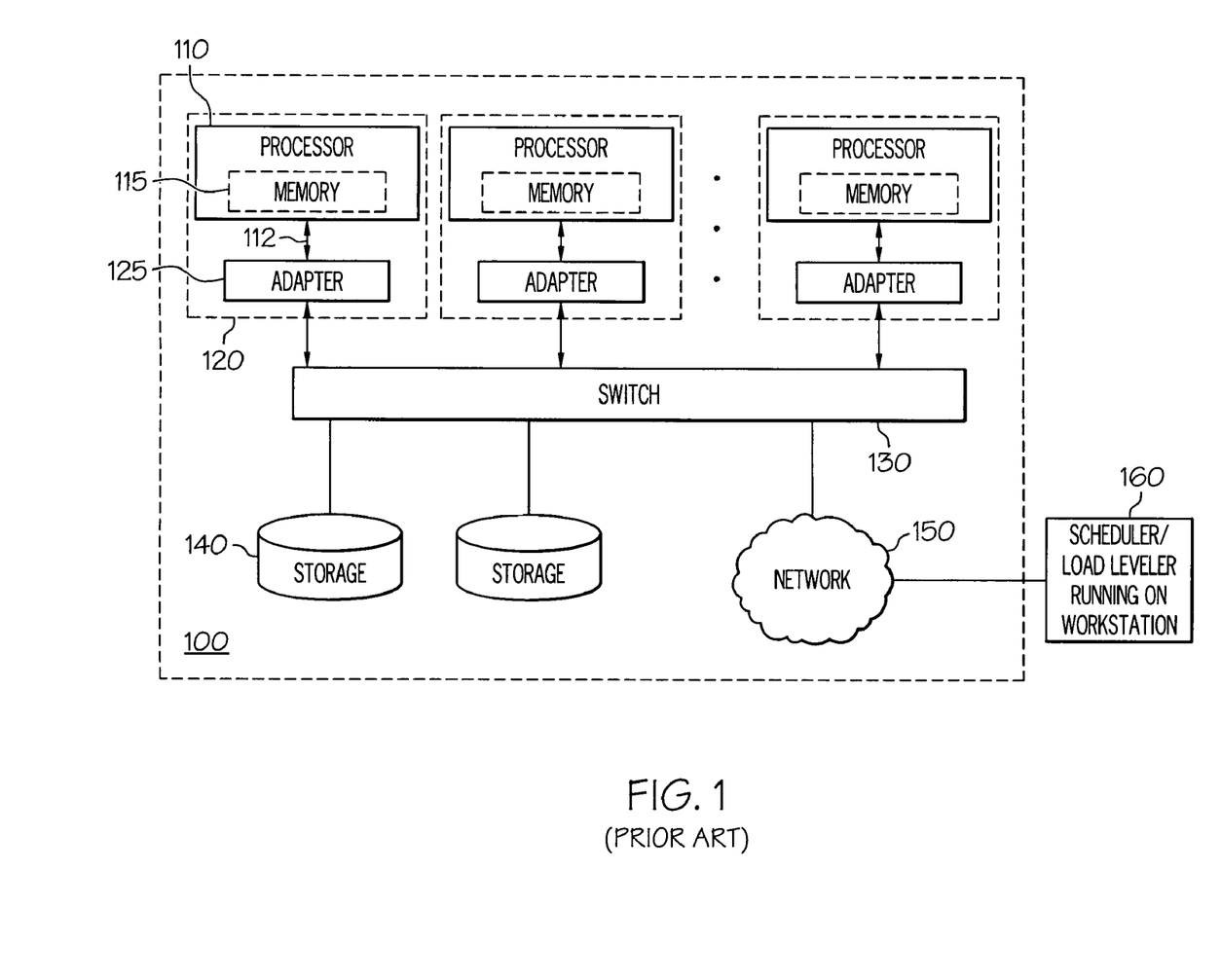
FIG. 1 is a diagram illustrating an example parallel computing system.

FIG. 1 is a block diagram showing an example multiple processor system 100 in a parallel computing system. As shown in FIG. 1, system 100 includes a plurality of processors 110 at each of a plurality of respective nodes or computing nodes 120. Each processor 110 can be referred to as a "host system". Each processor is implemented as a single processor having a single CPU or as a multiple processor system having a plurality of CPUs which cooperate together on processing tasks. An example of a processor 110 is a server such as a "Symmetric Multiprocessor" (SMP) system sold by the assignee of this application. Illustratively, a server such as an SMP may have from a few CPUs to 32 or more CPUs. Each processor, e.g., each server, includes a local memory 115. Each processor 110 operates semi-autonomously, performing work on tasks as required by user applications and one or more operating systems that run on each processor, as will be described further with respect to FIG. 2. Each processor is further connected via a bus 112 to a communications adapter 125 (hereinafter "adapter") at each node 120. The adapter, in turn, communicates with other processors over a network, the network shown here as including a switch 130, although the network could have a different topology such as bus, ring, tree, etc. Depending on the number of CPUs included in the processor 110, e.g., whether the processor is a single CPU system, has a few CPUs or is an SMP having many CPUs, the adapter can either be a stand-alone adapter or be implemented as a group of adapter units. For example, when the processor 110 is an SMP having 32 CPUs, eight adapter units, collectively represented as "adapter" 125, service the 32 CPUs and are connected to the 32 CPUs via eight input output (I/O) buses, which are collectively represented as "bus" 112. Each processor is connected to other processors within system 100 over the switch 130, and to storage devices 140. Processors 110 are also connected by switch 130 to an external network 150, which in turn, is connected to one or more external processors (not shown).

Storage devices 140 are used for paging in and out memory as needed to support programs executed at each processor 110, especially application programs (hereinafter "applications" or "user space applications") at each processor 110. By contrast, local memory 115 is available to hold data which applications are actively using at each processor 110. When such data is no longer needed, it is typically paged out to the storage devices 140 under control of an operating system function such as "virtual memory manager" (VMM). When an application needs the data again, it is paged in from the storage devices 140. The scheduler/load leveler 160 provides job scheduling and an advance reservation system for the parallel computing system 100.

To efficiently utilize the resources of the computing environment, scheduling techniques are used to schedule execution of computer jobs of the environment. As noted above, resource bookkeeping is traditionally buried in the lowest levels of the job scheduling logic, making it difficult and time consuming to extend existing job scheduling algorithms with new paradigms, such as backfill and preemption. (Again, this resource bookkeeping is the tracking of used, free, bad, and to-be-used resources in the job scheduling algorithm.) In view of this, presented herein is a clear and well-defined decoupling of the job scheduling algorithm from responsibility for maintaining the job's recorded resource usages.

Communication Protocol Stack

Figure 2:
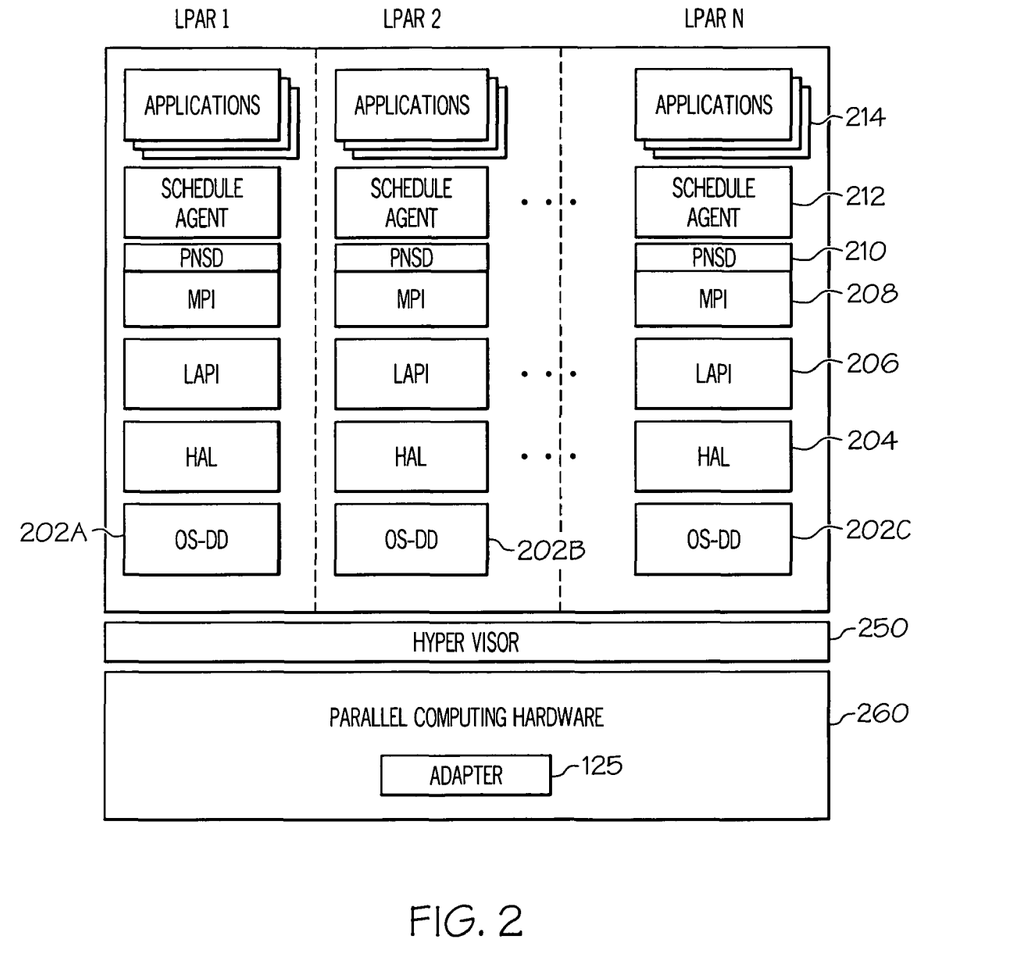
FIG. 2 is a diagram illustrates an example communication protocol stack operating on a processor of a parallel computing system such as that shown in FIG. 1.

FIG. 2 illustrates an example communication protocol stack operating on a processor 110 in a parallel computing system 100 such as that shown in FIG. 1. As shown in FIG. 2, the resources of the processor, including its memory, CPU instruction executing resources, and other resources, are divided into logical partitions known as LPARs (LPAR1, LPAR2, . . . , LPAR N). In each logical partition, a different operating system (OS-DD 202) may be used, such that to the user of the logical partition it may appear that the user has actual control over the processor. In each logical partition, the operating system 202*a*, 202*b*, and 202*c* controls access to privileged resources. Such resources include translation tables that include translation information for converting addresses such as virtual addresses, used by a user space application running on top of the operating system, into physical addresses for use in accessing the data.

However, there are certain resources that even the operating system is not given control over. These resources are considered "super-privileged", and are managed by a Hypervisor layer 250 which operates below each of the operating systems. The Hypervisor 250 controls the particular resources of the hardware 260 allocated to each logical partition according to control algorithms, such resources including particular tables and areas of memory that the Hypervisor 250 grants access to use by the operating system for the particular logical partition. The computing system hardware 260 includes the CPU, its memory 115 and the adapter 125. The hardware typically reserves some of its resources for its own purposes and allows the Hypervisor to use or allocate the rest of its resources, as for example, to each logical partition. A network resource table as described in FIG. 3 defines all of the network resources assigned to each parallel job executing on each LPAR.

Figure 4:
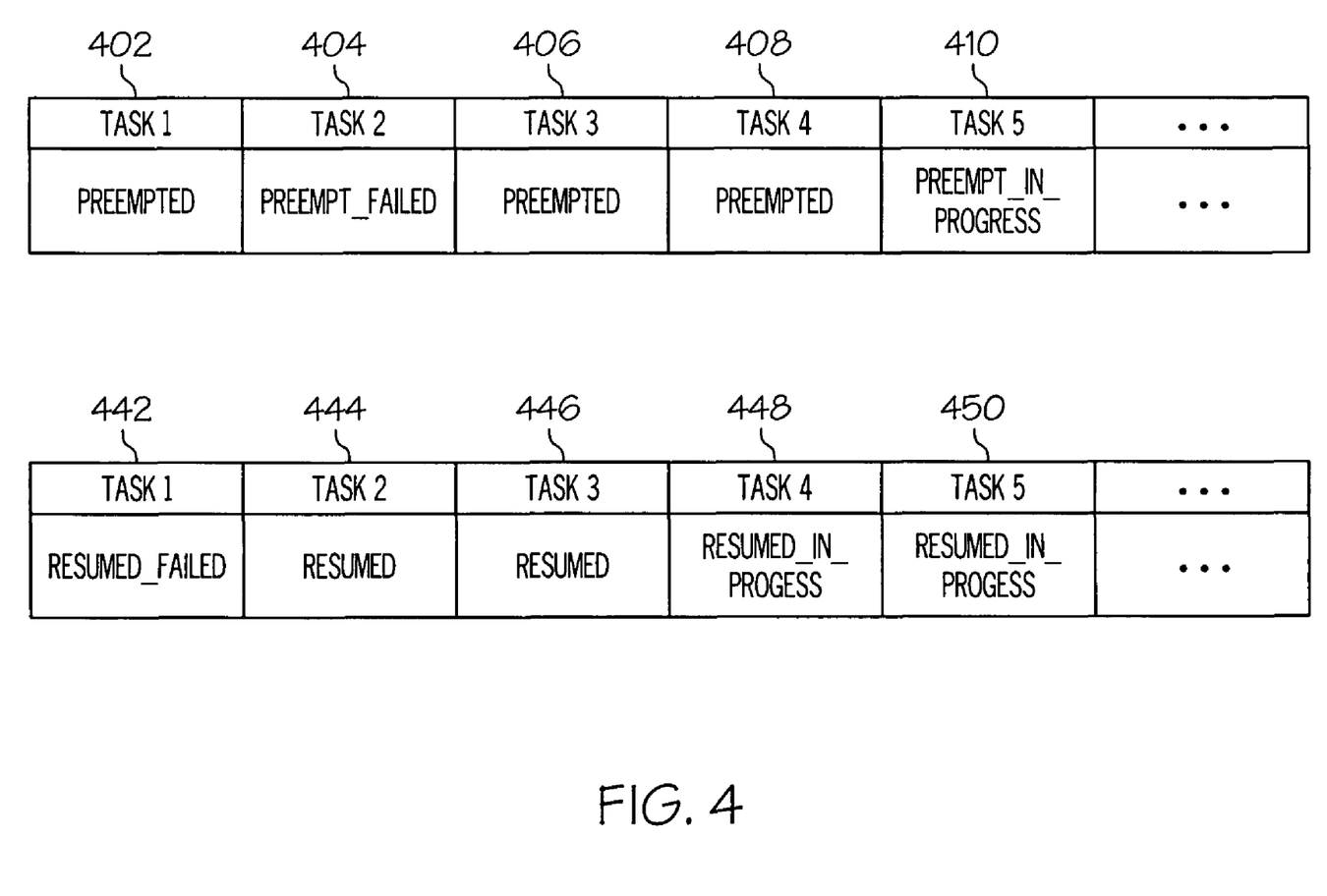
FIG. 4 illustrates an example status table used by the PNSD.

Within each logical partition, the user is free to select the user space applications and protocols that are compatible with the particular operating system in that logical partition. Typically, end user applications operate above other user space applications used for communication and handling of data. For example, in LPAR2, the operating system 202*b* is AIX, and the communication protocol layers HAL 204, LAPI 206 and MPI 208 operate thereon in the user space of the logical partition. One or more user space parallel applications operate above the MPI layer 208. In this example the operating system 202*a* is LINUX in LPAR 1. Other logical partitions may use other operating systems and/or other communication protocol stacks. In one embodiment, running on each LPAR is a PNSD (Protocol Network Services Daemon). Each LPAR maintains its own status table as shown in FIG. 4 to manage preemption requests by the PNSD Each PNSD application manages preemption requests for parallel jobs on each LPAR with status tables as shown in FIG. 4. The status table shown in FIG. 4 is associated with each parallel job. This PNSD application is further described in reference to flow diagrams in FIGS. 5 and 6 below. Also on each LPAR, a Scheduler Agent 212 communicates with the Scheduler 160 of FIG. 1 to schedule various parallel user space applications 214 that have multiple tasks distributed across the parallel computing system of FIG. 2.

Network Resource Table

Figure 3:
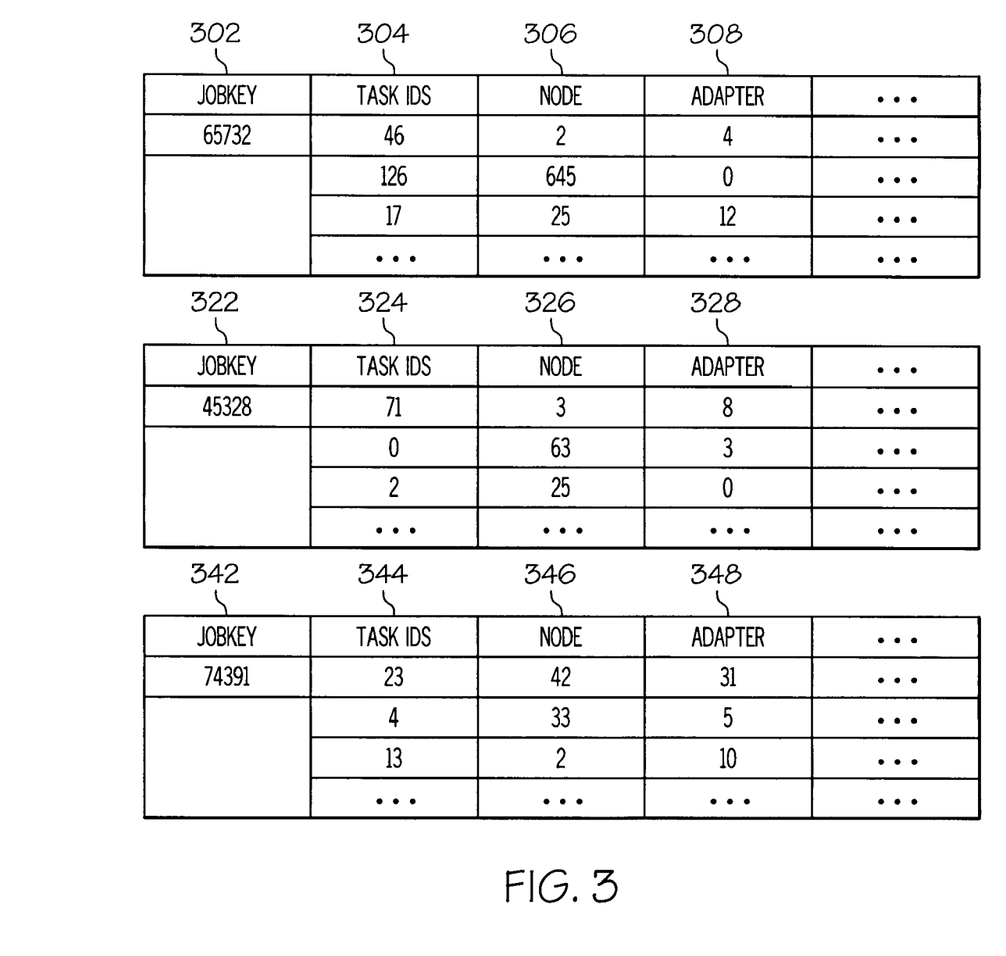
FIG. 3 illustrates an example network resource table operating for a processor such as that shown in FIG. 2.

FIG. 3 illustrates an example is Network Resource Table. Shown are three tables for three jobkeys 302, 322, and 342. Each key or jobkey has associated with it the taskIDs, 304, 324, and 344, for the user space parallel application or job. The computing node 306, 326, and 346 and the adapter 308, 328 and 348 are also associated for each task as shown. The use of the key 302, 322, and 342 provides a quick index into the network resource table for retrieving the address locations of each task, node and adapter for a parallel application. Although these network resource tables as shown as three separate tables in this illustration, other table configurations are possible within the true scope and spirit of the present invention.

Task Status Table

FIG. 4 illustrates an example is Status Table for each task associated with a parallel application. A status job is associated with each parallel application or parallel job running on each LPAR. It should be understood that this status table allows for managing the preemption requests by the PNSD application as further described below.

Shown are example states for tasks that are responded to a preemption request i.e. task 1 402 preempted, task 2 404 preempt_failed, task 3 406 preempted, task 4 408 preempted, and 410 task 5 preempt_in_progress.

Also shown in FIG. 4 are example states for tasks that are responded to a resume in preemption request i.e. task 1 442 preempted, task 2 444 resumed, task 3 446 resumed, task 4 448 resumed_in_progress, and 450 task 5 resumed_in_ progress. It should be noted that these are example states and other states are possible such as not-responding if a task hangs. The settings of these preemption states in the status table is further described in FIGS. 5, 6, and 7 below.

High Level Flow

Figure 5:
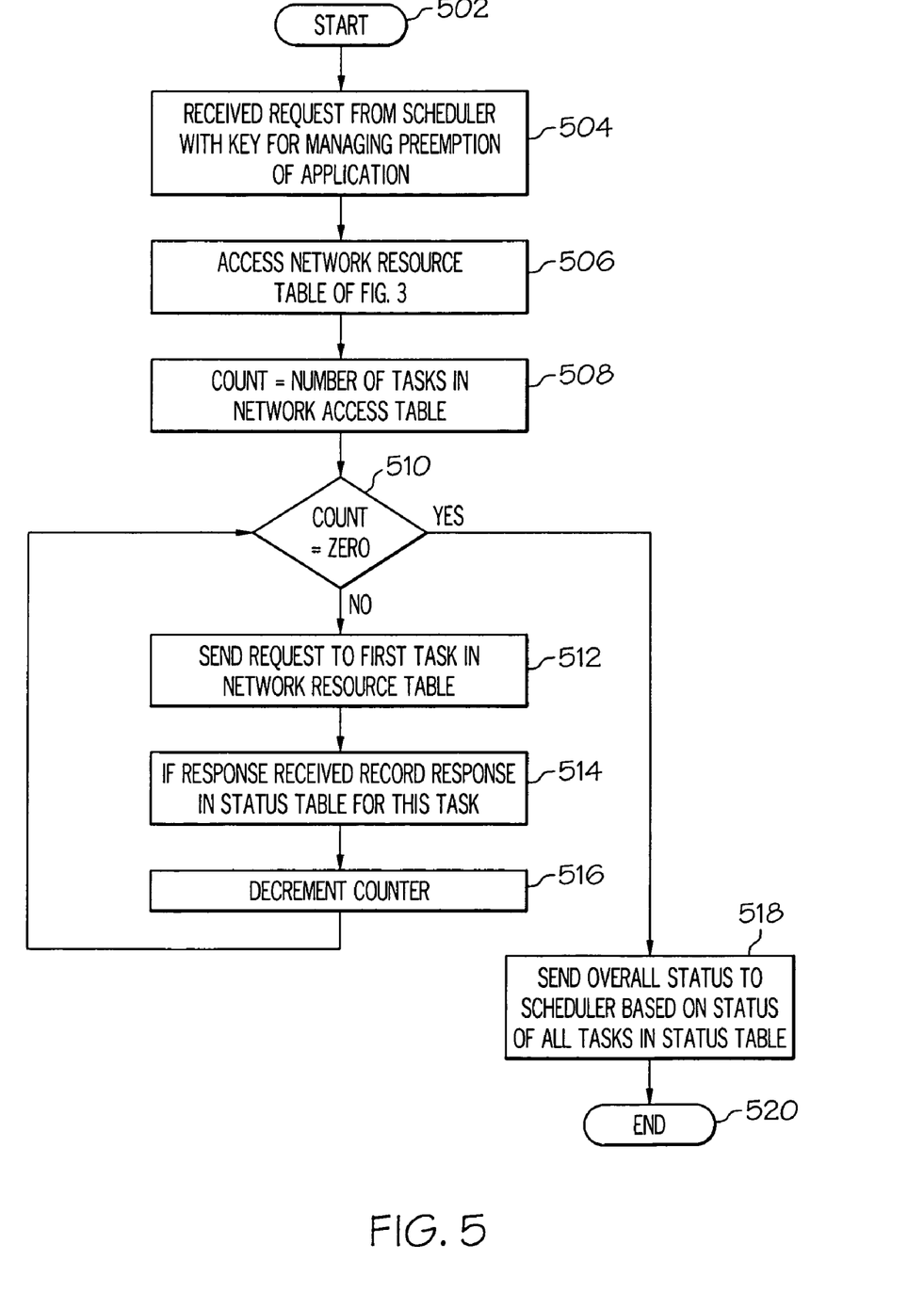
FIG. 5 is a high level flow of the PNSD software used to manage the preemption requests.

FIG. 5 illustrates a high level flow of the PNSD software used to manage the preemption requests. The process begins in step 502 and immediately proceeds to step 504 where a request is received from a scheduler/load leveler 160 by the PNSD application. The PNSD access the network resource table of FIG. 3. A loop begins in step 510, by setting a loop count equal to the number of tasks associated with the key for the job or parallel application in FIG. 3. The process continues in step 512 by sending a request to each task, node, and adapter resource using the information listed in the network resource table for the job key. Any replied received from a task is written into a status table of FIG. 4 in step 514. The counter decrements in step 516 and the process continues to repeat steps 510 through 516 until a request and response, if any (because the task could be hung and a timeout routine used to recover the task) is written into the status table. At the completion of this loop, the status for each task associated with the parallel application is gathered and records in the status table of FIG. 3. The over all status is then sent to the scheduler in step 518 and the process ends in step 520 until the next request is received. It is important to note that this flow reduces the complexity of the scheduler having to communicate with each task individually. The PNSD application manages preemption at each OS instead of job scheduler managing preemption per process/task as performed in the prior the art.

Applying High Level Flow to System

Figure 6:
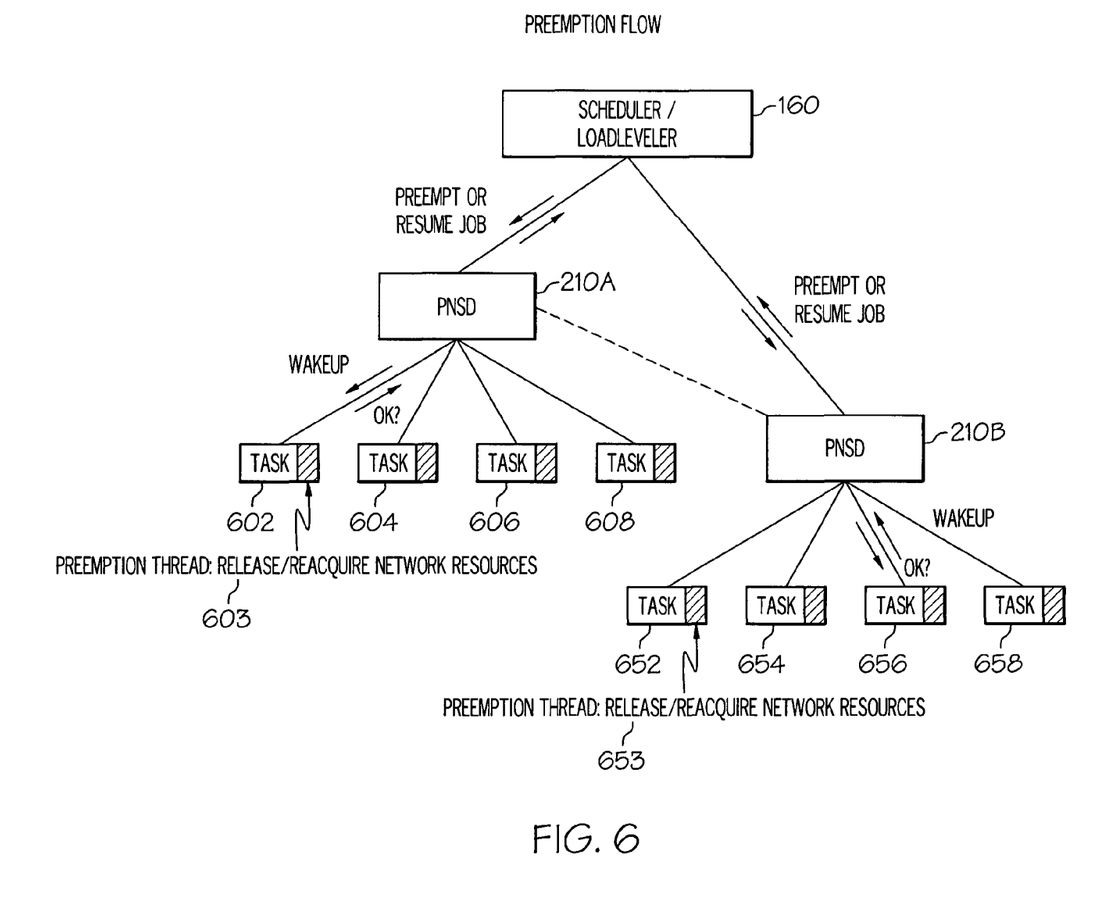
FIG. 6 is a flow that illustrates the concept of FIG. 4 applied to the system of FIG. 2.

FIG. 6 is a flow that illustrates the concept of FIG. 4 applied to the system of FIG. 2. The scheduler/load leveler 160 of FIG. 1 broadcasts a preemption requests to parallel computing system and each PNSD application 210, shown as 210*a* and 210*b* here to denote to different PNSD on two different logical partitions, such as those shown in FIG. 2, receives the request. Using the network resource table in FIG. 3 to get the information associated with the key for the parallel job or parallel application. A request is send by the PNSD application 210*a* and 210*b* to each of the tasks associated with the parallel job. As shown PNSD 210*a* sends a request to tasks 602, 604, 606, and 608. A reply is recorded in the status table of FIG. 4. Likewise PNSD 210*b* sends a request to tasks 652, 654, 656, and 658 and again a reply is recorded in the status table of FIG. 4. This provides preemption thread release/reacquire of each network resource as shown in 603 and 653.

Detailed Level Flow of Managing Preemption Request

Figure 7:
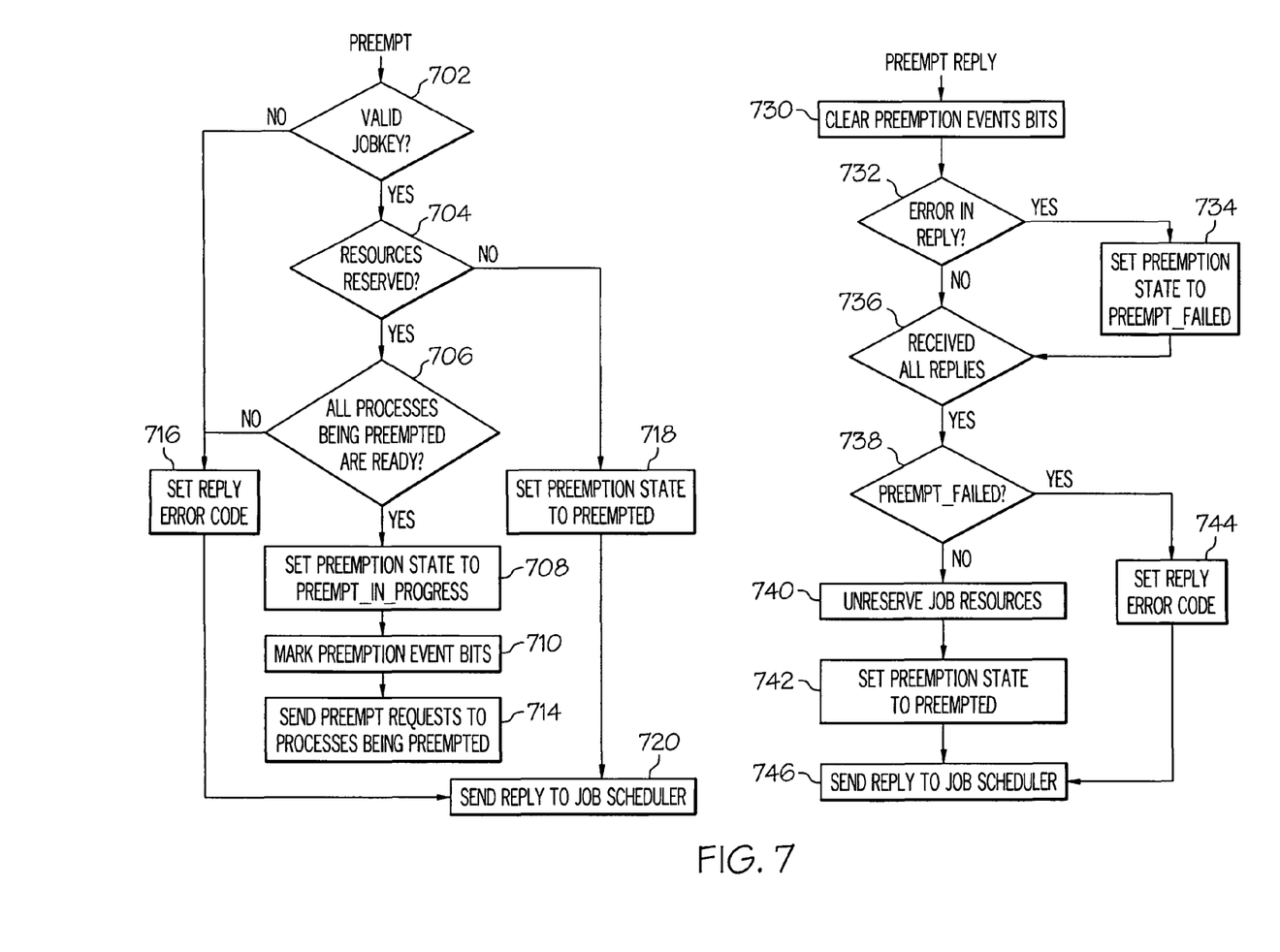
FIG. 7 is a more detailed flow diagram of FIG. 5 for the PNSD software used to manage the preemption requests.

FIG. 7 is a more detailed flow diagram of FIG. 5 for the PNSD software used to manage the preemption requests. The process begins with a preempt request command received from the scheduler/load leveler 160 of FIG. 1. A first test is made to ensure a valid jobkey is present in the request in step 702. If an invalid job key, an error is reported in steps 716 and 720. In the case when the job key is valid, a check is made to determine if a resource such as an adapter resource is reserved in step 704. Before a parallel job can run, the resources allocated for the job must be reserved for the job. Preemption allows one job to grab the resources from another job. In the case where the resource is not reserved, the process continues to step 718 where the status table in FIG. 4 is updated with preemption state set to "preempted" the process send by sending a reply to the requester in step 720. If the resource is reserved, a test to is made by review the status table of FIG. 4 to see if all the tasks associated with the parallel job or parallel application are ready. If the process/tasks are not ready in step 706, then an error is reported in steps 716 and 720. In the case where process/tasks are ready in step 706 the preemption status in the status table of FIG. 4 is set to "preempt_in_progress" in step 708 and the preemption bits marked in steps 710. The request to preempt the process or thread sent in step 714 is created and sent in step 720.

For the preempt reply flow, the preemption status in status table in FIG. 4 is cleared in step 730. A test is made to determine if there is an error in the reply 732 and in the event there is an error in the reply the status table is set to "preempt_failed". The process loops in step 736 until all replies are received. In the case there was a failure, the process returned an error code in step 744 and 746. In the case where the preempt_failed is false in step 738, the network resources or windows for resume reply are unreserved in step 742 and the status table in FIG. 4 is updated with preemption state set to "preempted" in step 740 and the process send by sending a reply to the requester in step 746. As stated above it is important to note that before a parallel job can run, the resources allocated for the job must be reserved for the job. Preemption allows one job to grab the resources from another job. So after preemption, the job being preempted must release resources. That's done after premption replies are received. Prior to resume, it is important to ensure the job resources are not reserved/used by other jobs and reserve the resources before asking the tasks to resume.

Detailed Level Flow of Managing Resume Request

Figure 8:
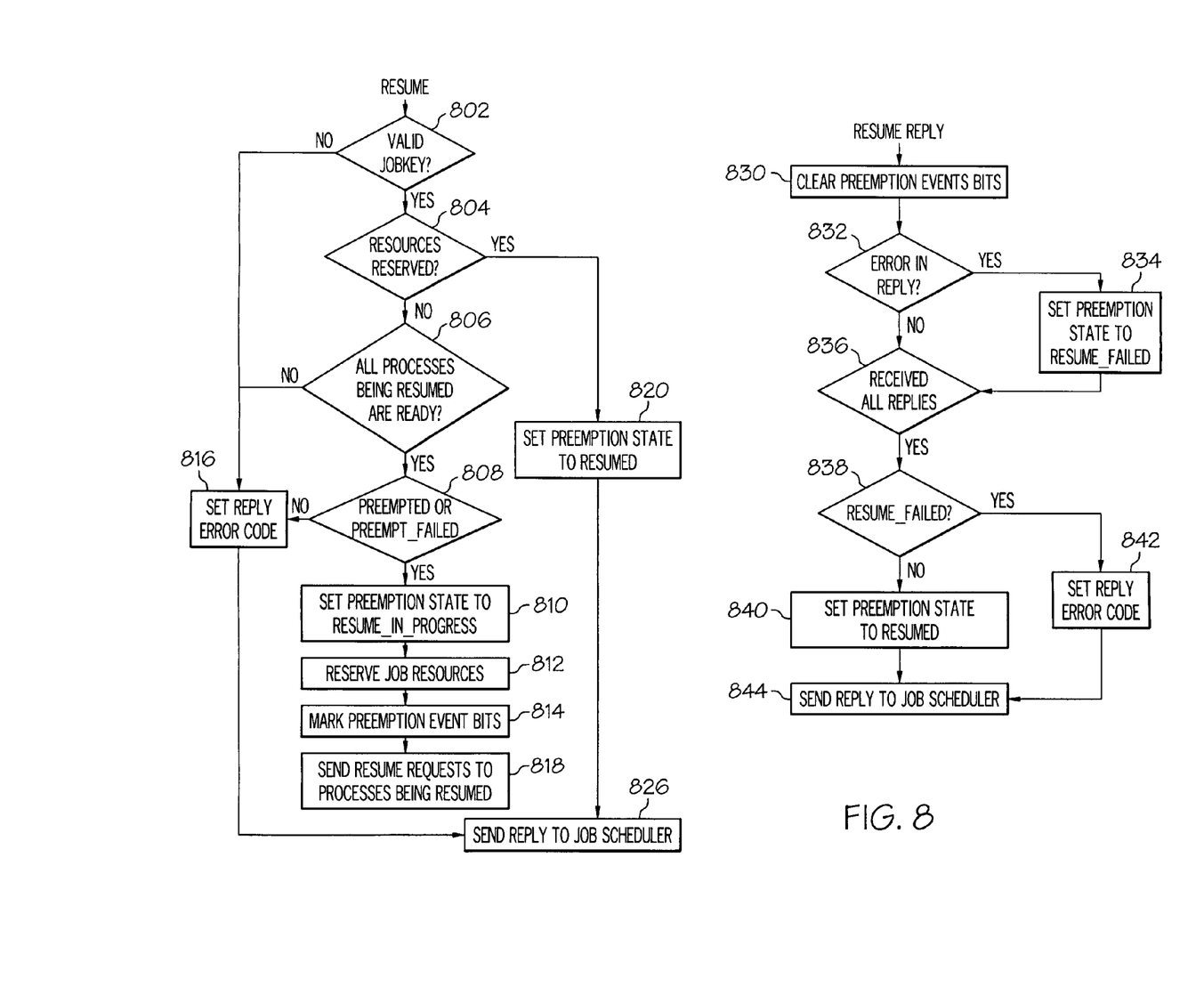
FIG. 8 is a more detailed flow diagram of FIG. 5 for the PNSD software used to manage the resume requests.

FIG. 8 is a more detailed flow diagram of FIG. 5 for the PNSD software used to manage the resume requests. The process begins with a preempt request command received from the scheduler/load leveler 160 of FIG. 1. A first test is made to ensure a valid jobkey is present in the request in step 802. If an invalid job key, an error is reported in steps 816 and 826. In the case when the job key is valid, a check is made to determine if a resource such as an adapter resource is reserved in step 804. In the case where the resource is reserved, the process continues to step 820 where the status table in FIG. 4 is updated with preemption state set to "resumed" the process send by sending a reply to the requester. If the resource is not reserved, a test to is made by review the status table of FIG. 4 to see if all the tasks associated with the parallel job or parallel application are ready. If the process/tasks are not ready in step 806, then an error is reported in steps 816 and 826. In the case where process/tasks are ready in step 806, the all a test is made to see if the process/task is preempted or preempt_failed in step 808. If the tasks/process are not preempted or preempt_failed, an error is set in step 816 and sent back to schedule in step 826. In the case the preempted or preempted_failed is set, then preemption status in the status table of FIG. 4 is set to "resume_in_progress". Next, in step 812 the parallel application or job resources are reserved. The preemption event bits are sent in step 814 and the request to preempt the process or thread sent in step 818 is created and sent in step 826.

For the resume reply flow, the preemption status in status table in FIG. 4 is cleared in step 830. A test is made to determine if there is an error in the reply 832 and in the event there is an error in the reply the status table is set to "resume_failed". The process loops in step 836 until all replies are received. In the case there was a failure, the process returned an error code in step 842 and 844. In the case where the resume_failed is false in step 738, the status table in FIG. 4 is updated with preemption state set to "resumed" in step 840 and the process send by sending a reply to the requester in step 844.

NON-LIMITING EXAMPLES

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of managing preemption of a parallel application, the method on a computing node in a parallel computing system comprising:
receiving, from a scheduler, a request with a key for managing preemption of a parallel application with a plurality of tasks running on at least one computing node in a multi-processor system as part of a parallel computing system, wherein the key has been previously associated to the parallel application, and wherein the key is associated with a plurality of tasks of the parallel application;
accessing from a network resource table using the key, an address location of each task in the plurality of tasks associated with the parallel application;
collecting a status for each of the tasks by completing the following
sending a request to each of the tasks; and
storing at least one preemption related status entry for each of the tasks in a status table based on a type of reply received from each of the tasks; and
sending a reply to the scheduler with an overall preemption related status of the parallel application based on the preemption related status entry for each of the tasks in the status table.

2. The method of claim 1, wherein the accessing from a network resource table using the key includes accessing address locations of nodes and adapters in the parallel computing system, for each of the tasks associated with the parallel application.

3. The method of claim 1, wherein the receiving, from a scheduler, the request with a key for managing preemption of a parallel application includes receiving a request for preempting the parallel application, and
wherein the sending the reply to the scheduler with the overall preemption related status of the parallel application includes sending the overall preemption related status to indicate one of
preempted,
preempt_failed, and
preempt_in_progress.

4. The method of claim 1, wherein the receiving, from a scheduler, the request with a key for managing preemption of a parallel application includes receiving a request for resuming the parallel application, and
wherein the sending the reply to the scheduler with the overall preemption related status of the parallel application includes sending the overall preemption related status to indicate one of
resumed;
resumed_failed; and
resume_in_progress.

5. The method of claim 1, wherein the storing includes storing a preemption related status for each of the tasks associated with the parallel application.

6. The method of claim 1, wherein the storing includes storing a preemption related status indicating whether each of the tasks is one of:
preempted;
preempt_failed;
preempt_in_progress,
resumed;
resume_failed; and
resume_in_progress.

7. A computer program product for managing preemption of a parallel application on at least one computing node in a multi-processor system as part of a parallel computing system, the computer program product comprising:
a non-transitory computer readable storage medium readable by the computing node, the computer readable storage medium storing instructions configured to perform a method comprising:
receiving, from a scheduler, a request with a key for managing preemption of said parallel application with a plurality of tasks running on said computing node, wherein the key has been previously associated to the parallel application, and wherein the key is associated with a plurality of tasks of the parallel application;
accessing from a network resource table using the key, an address location of each task in the plurality of tasks associated with the parallel application;
collecting a status for each of the tasks by completing the following
sending, based on the address location, a request to each of the tasks; and
storing at least one preemption related status entry for each of the tasks in a preemption related status table based on a type of reply received from each of the tasks; and
sending a reply to the scheduler with an overall preemption related status of the parallel application based on the preemption related status entry for each of the tasks in the status table.

8. The computer program product according of claim 7, wherein the accessing from a network resource table using the key includes accessing address locations of nodes and adapters in the parallel computing system, for each of the tasks associated with the parallel application.

9. The computer program product according to claim 7, wherein the receiving, from a scheduler, the request with a key for managing preemption of a parallel application includes receiving a request for preempting the parallel application, and
wherein the sending the reply to the scheduler with the overall preemption related status of the parallel application includes sending the overall preemption related status to indicate one of
preempted,
preempt_failed, and
preempt_in_progress.

10. The computer program product according to claim 7, wherein the receiving, from a scheduler, the request with a key for managing preemption of a parallel application includes receiving a request for resuming the parallel application, and
wherein the sending the reply to the scheduler with the overall s preemption related status of the parallel application includes sending the overall preemption related status to indicate one of
resumed;
resumed_failed; and
resume_in_progress.

11. The computer program product according to claim 7, wherein the storing includes storing a preemption related status for each of the tasks associated with the parallel application.

12. The computer program product according to claim 7, wherein the storing includes storing a preemption related status indicating whether each of the tasks is one of:
preempted;
preempt_failed;
preempt_in_progress,
resumed;
resume_failed; and
resume_in_progress.

13. A parallel computing system for managing preemption of a parallel application on at least one computing node in a multi-processor system in the parallel computing system, the parallel computing system comprising:
- a computer memory capable of storing machine instructions and a software application for managing preemption of the parallel application; and
- a processor in communication with the computer memory, the processor capable of accessing the memory, the processor performing a method comprising:
  - receiving, from a scheduler, a request with a key for managing preemption of the parallel application with a plurality of tasks running on the computing node, wherein the key has been previously associated to the parallel application, and wherein the key is associated with a plurality of tasks of the parallel application;
  - accessing from a network resource table using the key an address location of each task in the plurality of tasks associated with the parallel application;
  - collecting a status for each of the tasks by completing the following
    - setting a loop count equal to a number of tasks associated with the key;
    - sending a request to each of the tasks, wherein the request is sent in response to the loop count being greater than 0;
    - storing at least one preemption related status entry for each of the tasks in a status table based on a type of reply received from each of the tasks; and
    - decrementing the loop count in response to receiving a reply to the request that has been sent; and
  - sending a reply to the scheduler with an overall preemption related status of the parallel application based on the preemption related status entry for each of the tasks in the status table.

14. The system according to claim 13, wherein the accessing from a network resource table using the key includes accessing address locations of nodes and adapters in the parallel computing system, for each of the tasks associated with the parallel application.

15. The system according to claim 13, wherein the receiving, from a scheduler, the request with a key for managing preemption of a parallel application includes receiving a request for preempting the parallel application application, and
wherein the sending the reply to the scheduler with the overall preemption related status of the parallel application includes sending the overall preemption related status to indicate one of
preempted,
preempt_failed, and
preempt_in_progress.

16. The system according to claim 13, wherein the receiving, from a scheduler, the request with a key for managing preemption of a parallel application includes receiving a request for resuming the parallel application, and
wherein the sending the reply to the scheduler with the overall preemption related status of the parallel application includes sending the overall preemption related status to indicate one of
resumed;
resumed_failed; and
resume_in_progress.

17. The system according to claim 13, wherein the storing includes storing a preemption related status for each of the tasks associated with the parallel application.

18. The system according to claim 13, wherein the storing includes storing a preemption related status indicating whether each of the tasks is one of:
preempted;
preempt_failed;
preempt_in_progress,
resumed;
resume_failed; and
resume_in_progress.

* * * * *